May 12, 1953  N. R. SKLAR  2,637,931
LATCHING AND RELEASING MEANS
Filed Jan. 16, 1951

Inventor
Nathan R. Sklar
Schroeder, Merriam,
Hofgren & Brady
Att'y

Patented May 12, 1953

2,637,931

UNITED STATES PATENT OFFICE 2,637,931

LATCHING AND RELEASING MEANS

Nathan R. Sklar, Chicago, Ill.

Application January 16, 1951, Serial No. 206,200

8 Claims. (Cl. 43—83)

This invention relates to latching and releasing means and more particularly to a latching means for holding two members in separated position against a resilient force and trigger-operated release means for releasing the latching means.

It is the general object of this invention to produce a new and improved latching and releasing means.

It is a more specific object of this invention to produce a latching means for holding two members in separated position which is moved into latching engagement by contact with one of the members and which is adapted to be released by a trigger.

A further object of the invention is to produce an animal trap, for example a mouse trap, which incorporates a latching and releasing means described in the previous paragraphs.

Another object of the invention is to produce an animal trap having a latch provided with two finger portions, one of which engages a movable jaw on the trap to hold it in cocked position and the other of which engages a trigger to hold the first finger in engagement with the jaw, thereby providing a trap having an extremely sensitive trigger release mechanism.

A further object of the invention is to produce an animal trap having a latch provided with two finger portions, one to engage a trigger and the other to engage a jaw on the trap together with means on one of the jaws for moving the fingers into latching engagement with pivotal movement of the jaw to a cocked position.

Yet another object of the invention is to produce an animal trap of the type described in the preceding paragraphs which includes trigger-operated release means for releasing the fingers to permit the jaw to spring to closed position under the influence of a spring.

Other and further objects of the invention will be readily apparent from the following description and drawings, in which.

Figure 1:
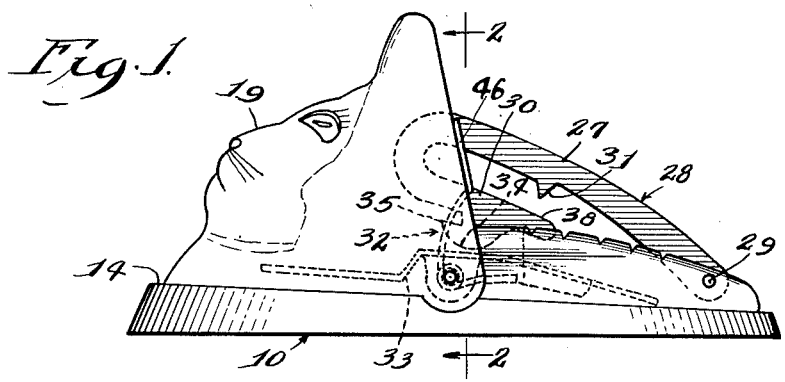
Fig. 1 is a side elevation of an animal trap embodying the invention.
Figure 2:
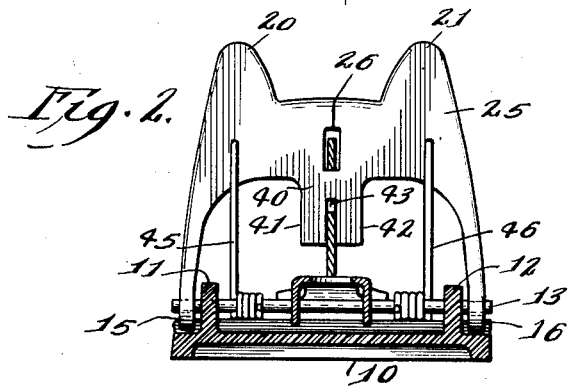
Fig. 2 is a vertical transverse section taken along line 2—2 of Fig. 1.

While this invention is susceptible of embodiment in many different forms, there is shown in the drawings and will herein be described in detail one specific embodiment with the understanding that the present description is to be considered as an exemplification of the principles of the invention and is not intended to limit the invention to the embodiment illustrated. The scope of the invention will be pointed out in the appended claims.

For the purposes of exemplary disclosure, the subject matter of this invention is shown as embodied in a mouse trap. Mouse traps as such are common household accessories and in the past have consisted of a pan which is to be baited, a latch engaged by the pan and serving to hold a spring propelled bar in cocked or set position. In order to set such a trap, it is necessary that the bar be cocked and then the latch engaged with the pan. In engaging the latch and pan it is necessary that the operator's fingers be located in the area through which the bar sweeps with some speed as the latch is released. If the latch is properly engaged the trap will remain in set or cocked position. If the latch is improperly engaged, the bar will immediately be propelled by the spring through the area in which the operator's fingers lie. One of the difficulties of such traps is, of course, the fact that the operator cannot determine whether or not the latch has been properly engaged until he releases the pan and, if such engagement has not been effected, the result is a bruised finger.

Efforts to produce a mouse trap which can be set by an operator without bringing his or her fingers into the danger area have, according to the best available information, been heretofore unsuccessful in that the trigger mechanism of such mouse traps has been extremely insensitive, and thus such traps have failed to spring even though the bait carried by them has been entirely eaten.

By incorporating the latching and releasing means of this invention in a mouse trap, there has been produced a trap which may readily and easily be set without bringing the fingers of the operator into or even near the danger area and yet one which is positive in its operation and extremely sensitive.

Figure 3:
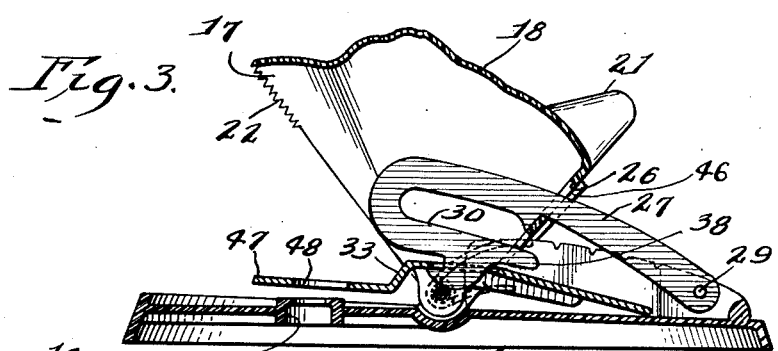
Fig. 3 is a vertical longitudinal section through the device shown in Fig. 1.
Figure 4:
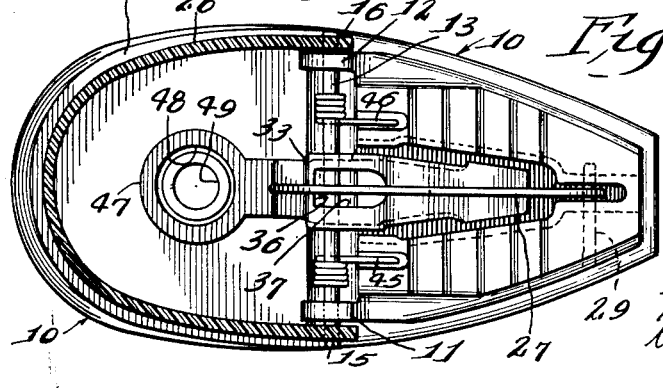
Fig. 4 is a top plan view of the device shown in Fig. 1 with the left-hand portion thereof broken away in order more clearly to illustrate the underlying parts.

Referring now to the drawings, the mouse trap shown comprises an elongated base 10 provided at approximately its mid-section with a pair of integral, upstanding lugs 11 and 12 which carry a rod 13 which extends from side to side of the base. That portion 14 of the base 10 between the rod 13 and the left-hand end (as seen in Figs. 1, 3 and 4) of the base constitutes one jaw of the two-jaw type trap shown.

Pivotally mounted on the rod 13, as by a pair of depending ears 15 and 16, is an upper or movable jaw 17. The jaw 17 constitutes the lower edge of a simulated cat's head 18 which is provided with a face 19 and projections 20 and 21 simulating the ears of a cat. If desired, the jaw 17 may be provided with a serrated or toothed portion 22 more firmly to grasp an animal when the trap is sprung.

The back portion 25 of the head is provided with a vertical slot 26 through which the first portion 27 of a latch member 28 extends. The latch member is pivotally secured at 29 to the end of the base 10 opposite the jaw portion 14 and is provided with a return curved portion 30 which is parallel to but vertically spaced from the first portion 27 of the latch. The portion 27 carries a first finger 31 adapted to engage the bottom side of the slot 26 in order to hold the head 18 in the cocked position shown in Fig. 3. The return curved portion 30 of the latch carries a second finger 32 for engagement with a trigger mechanism 33 pivotally mounted on the rod 13. The second finger 32 includes a curved camming portion 34 terminating in an integral hook 35 which is adapted to engage the side 36 of an opening 37 formed in the trigger member 33 to hold the latch in the engaged position shown in Fig. 3 and thus to hold the head and jaw 17 in a position angularly displaced from the base 10, in which position the trap is set or cocked. The return curved portion is also provided with a portion 38 extending rearwardly of the finger 32.

On the back 25 of the head an integral bifurcated guide member 40 is provided, the guide member having a pair of legs 41 and 42 which straddle the return curved portion 30 of the latch in order to hold the latch against sidewise movement. When the head is pivoted from the sprung position shown in Fig. 1 toward the cocked position shown in Fig. 3 (which pivoting may be accomplished by finger pressure on the ears 20 and 21) the base 43 of the bifurcated guide member 40 is swung downwardly into contact with the return curved portion 30 to press the finger 32 into the opening 37. The cam portion 34 of the finger 32 serves to pivot the trigger 33 about the rod 13 to permit the hook 35 to slip under the side 36 of the opening. When finger pressure on the ears is gently released, the hook moves upwardly to engage the underside of the opening to retain the trap in cocked position against the tension of coil springs 45 and 46 which bear against the head and base and are coiled about the rod 13.

The trigger 33 is provided with a pan portion 47 having a circular opening 48 therein. A second circular opening 49 is provided in the base immediately beneath the opening 48 and the trap is baited merely by inserting the bait upwardly through the opening 49 to position it immediately beneath the opening 48. It is preferred to form the opening 49 with a smaller diameter at its upper end to facilitate baiting.

Inasmuch as the head is held in cocked position by the finger 31, and that finger is held in engagement with the bottom of slot 26 by the finger 32, the hook portion 35 of the second finger is movable out of engagement with the trigger under very little pressure. Thus the trigger release mechanism is very sensitive as the greater portion of the pressure of springs 45 and 46 is borne by the finger 31 and the spring pressure transmitted to the trigger mechanism is only that required to hold the hook 35 in engagement with the underside of the trigger adjacent the opening 37. In attempting to get at the bait, a mouse must extend its muzzle through the opening 48 and any contact with the sides of the opening, that is with the pan portion 47, serving to rotate the trigger 33 even slightly about the rod, releases the hook 35. As soon as the hook is released, the latch 28 is free to pivot upwardly, in which direction it is urged by the head 18 at the point of engagement of the finger 31 and the slot 26. Even should the finger 32 fail to release, the downwardly pivotal movement of the trigger 33 raises its other end against the portion 38 to pivot the latch. When such pivotal movement of the latch occurs, the finger 31 releases the head to permit the jaw 17 to snap toward the jaw portion 14 and, of course, against and upon a mouse therebetween. The relative spring pressure borne by each of the fingers 31 and 32 may be varied by shifting the pivot point 29 or by moving the location of the finger 31 on the latch 27. Ideally, most, but not quite all, of the spring pressure is carried or resisted by the finger 31. If a more or less sensitive trigger is desired, more or less of the spring pressure is shifted to the finger 31.

With the finger 31 absorbing most of the stress of the spring when the trap is cocked, the trigger mechanism is such that a mouse must actually insert his head through the opening 48 and press downwardly on the trigger in order to set off the trap. Experiments have shown that mice frequently crawl all over the trap before actually attacking the bait. The trigger mechanism of this invention will not release until the mouse's head actually moves the pan portion 47 and thus will not release prematurely. In addition, the entire trigger mechanism is more or less shielded from operation so that the travels of the mouse over and about the trap will not release it. Because of the fact that the trap releases only when the mouse inserts its muzzle into the opening 48 the jaw portion snaps shut on the neck of the mouse thereby breaking the neck of the mouse with no loss of blood. The trap may therefore be used over and over with the same bait and further catches are not discouraged by the odor of blood from previous victims.

I claim:

1. An animal trap comprising an elongated base, a rod mounted on the base intermediate the ends thereof with the portion of the base between the rod and one end of the base forming a jaw, a member simulating a cat's head pivotally mounted on the rod for movement between a cocked position in which a jaw element of the head is angularly displaced relative to the jaw on the base and a sprung position in which the jaws are parallel and in contact with each other, a spring mounted on the rod and biasing the head to sprung position, a trigger pivotally mounted on the rod, a latch having one end pivoted to the other end of the base and having a first portion extending through a slot in the head and a return curved portion parallel to and vertically spaced from the first portion, a finger carried by the first portion of the latch for engaging the portion of the head at the slot to hold the head in cocked position, a second finger carried by the return curved portion for engaging the trigger to hold the first finger engaged with the portion of the head at the slot, and a setting element on the head having a portion positioned to contact the return curved portion as the head is pivoted toward cocked position to pivot the latch whereby to engage the fingers with the portion of the head at the slot and to engage the trigger to hold the head in cocked position.

2. An animal trap comprising an elongated base, a rod mounted on the base intermediate the ends thereof with the portion of the base between the rod and one end of the base forming a jaw, a member simulating a cat's head pivotally mounted on the rod for movement between a cocked position in which a jaw element of the head is angularly displaced relative to the jaw on the base and a sprung position in which the jaws are parallel and in contact with each other, a spring mounted on the rod and biasing the head to sprung position, a trigger pivotally mounted on the rod, a latch having one end pivoted to the other end of the base and having a first portion extending through a slot in the head and a return curved portion parallel to and vertically spaced from the first portion, a finger carried by the first portion of the latch for engaging the portion of the head at the slot to hold the head in cocked position, a second finger carried by the return curved portion for engaging the trigger to hold the first finger engaged with the portion of the head at the slot, and a bifurcated guide means on the back of the head and having a pair of spaced parallel legs straddling the return curved portion of the latch.

3. An animal trap comprising an elongated base, a rod mounted on the base intermediate the ends thereof with the portion of the base between the rod and one end of the base forming a jaw, a member simulating a cat's head pivotally mounted on the rod for movement between a cocked position in which a jaw element of the head is angularly displaced relative to the jaw on the base and a sprung position in which the jaws are parallel and in contact with each other, a spring mounted on the rod and biasing the head to sprung position, a trigger pivotally mounted on the rod, a latch having one end pivoted to the other end of the base and having a first portion extending through a slot in the head and a return curved portion parallel to and vertically spaced from the first portion, a finger carried by the first portion of the latch for engaging the portion of the head at the slot to hold the head in cocked position, a second finger carried by the return curved portion for engaging the trigger to hold the first finger engaged with the portion of the head at the slot, and a guide member on the back of the head, said guide member having a pair of spaced parallel legs straddling the return curved portion of the latch and having a base between the legs adapted to contact the return curved portion as the head is pivoted toward cocked position to pivot the latch whereby to engage the fingers with the portion of the head at the slot and to engage the trigger to hold the head in cocked position.

4. An animal trap comprising an elongated base, a rod mounted on the base intermediate the ends thereof with the portion of the base between the rod and one end of the base forming a jaw, a member simulating a cat's head pivotally mounted on the rod for movement between a cocked position in which a jaw element of the head is angularly displaced relative to the jaw on the base and a sprung position in which the jaws are parallel and in contact with each other, a spring mounted on the rod and biasing the head to sprung position, a trigger having a release opening pivotally mounted on the rod, a latch having one end pivoted to the other end of the base and having a first portion extending through a slot in the head and a return curved portion parallel to and vertically spaced from the first portion, a finger carried by the first portion of the latch for engaging the portion of the head at the slot to hold the head in cocked position, a second finger carried by the return curved portion with said second finger comprising a cam portion terminating in a hook and with said cam being adapted to pivot the trigger upon pivotal movement of the latch to align the opening in the trigger with the second finger for hooking engagement with the trigger to hold the first finger engaged with the portion of the head at the slot, and a setting element on the head having a portion positioned to contact the latch as the head is pivoted toward cocked position to pivot the latch.

5. An animal trap comprising an elongated base, a rod mounted on the base intermediate the ends thereof with the portion of the base between the rod and one end of the base forming a jaw, a member simulating a cat's head pivotally mounted on the rod for movement between a cocked position in which a jaw element of the head is angularly displaced relative to the jaw on the base and a sprung position in which the jaws are parallel and in contact with each other, a spring mounted on the rod and biasing the head to sprung position, a trigger having a release opening pivotally mounted on the rod, a latch having one end pivoted to the other end of the base and having a first portion extending through a slot in the head and a return curved portion parallel to and vertically spaced from the first portion, a finger carried by the first portion of the latch for engaging the portion of the head at the slot to hold the head in cocked position, a second finger carried by the return curved portion with said second finger comprising a cam portion terminating in a hook and with said cam being adapted to pivot the trigger upon pivotal movement of the latch to align the opening in the trigger with the second finger for hooking engagement with the trigger to hold the first finger engaged with the portion of the head at the slot, and a guide member on the back of the head, said guide member having a pair of spaced parallel legs straddling the return curved portion of the latch and having a base between the legs adapted to contact the return curved portion as the head is pivoted toward cocked position to pivot the latch whereby to engage the first finger with the portion of the head at the slot and to engage the hook with a portion of the trigger adjacent the opening to hold the head in cocked position.

6. An animal trap comprising a base, a jaw member pivotally mounted on the base for movement between a cocked position in which the jaw member is angularly displaced relative to the base and a sprung position in which the jaw is parallel to and in contact with the base, means biasing the jaw member to sprung position, a trigger having a release opening pivotally mounted on the base, a latch pivotally mounted on the base and having a first portion extending through a slot in the jaw member and a return curved portion parallel to and vertically spaced from the first portion, a finger carried by the first portion of the latch for engaging the slot to hold the jaw member in cocked position, a second finger carried by the return curved portion with said second finger comprising a cam portion terminating in a hook and with said cam being adapted to pivot the trigger upon pivotal movement of the latch to align the opening in the trigger with the second finger for hooking engagement to hold the first finger in engagement with a portion of the head at the slot, and a guide member on the jaw member, said guide member having a pair of spaced parallel legs straddling the return curved portion of the latch and having a base between the legs adapted to contact the recurved portion as the jaw member is pivoted toward cocked position whereby to engage the first finger with the portion of the head at the slot and to engage the hook with the portion of the trigger adjacent opening to hold the jaw member in cocked position.

7. An animal trap comprising a base, a jaw member pivotally mounted on the base for movement between a cocked position in which the jaw member is angularly displaced relative to the base and a sprung position in which the jaw is parallel to and in contact with the base, means biasing the jaw member to sprung position, a trigger pivotally mounted on the base, a latch pivotally mounted on the base and having a finger portion for engaging the jaw member to hold the jaw member in cocked position and a second finger portion for engaging the trigger to hold the first finger portion engaged with the jaw member, and a setting element on the jaw member having a portion positioned to contact the latch as the jaw member is pivoted toward cocked position to pivot the latch whereby to engage the fingers with the jaw member and trigger to hold the jaw member in cocked position.

8. In a device of the character described having a base, a member pivotally mounted on the base for movement between a cocked position in which the member is angularly displaced relative to the base and a sprung position in which a portion of the member is urged into contact with the base by a spring, release means for the member comprising a trigger having a release opening pivotally mounted on the rod, a latch having one end pivoted to the base and having a first portion extending through a slot in the member and a return curved portion parallel to and vertically spaced from the first portion, a finger carried by the first portion of the latch for engaging the portion of the head at the slot to hold the member in cocked position, a second finger carried by the return curved portion with said second finger comprising a cam portion terminating in a hook and with said cam being adapted to pivot the trigger upon pivotal movement of the latch to align the opening in the trigger with the second finger for hooking engagement to hold the first finger engaged with the member, and a setting element on the member having a portion positioned to contact the latch as the member is pivoted toward cocked position to pivot the latch.

NATHAN R. SKLAR.

References Cited in the file of this patent

UNITED STATES PATENTS

| Number | Name | Date |
|---|---|---|
| 1,180,909 | Cunningham | Apr. 25, 1916 |
| 1,675,532 | Cessna | July 3, 1928 |
| 2,321,617 | Peterson | June 15, 1943 |